Figure 1:
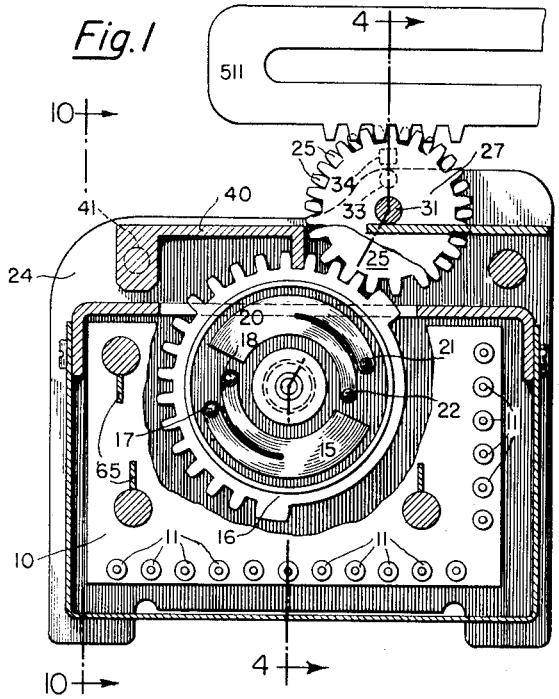

Oct. 11, 1960 R. S. BRADSHAW 2,955,755
ELECTRO-MECHANICAL STORAGE, TRANSFER AND READ-OUT DEVICE
Filed July 29, 1955 3 Sheets-Sheet 1

INVENTOR.
ROBERT S. BRADSHAW
BY
*Ralzemond B. Parker*
ATTORNEY

Oct. 11, 1960 R. S. BRADSHAW 2,955,755
ELECTRO-MECHANICAL STORAGE, TRANSFER AND READ-OUT DEVICE
Filed July 29, 1955 3 Sheets-Sheet 2

INVENTOR.
ROBERT S. BRADSHAW
BY
Ralzemond B. Parker
ATTORNEY

Oct. 11, 1960 R. S. BRADSHAW 2,955,755
ELECTRO-MECHANICAL STORAGE, TRANSFER AND READ-OUT DEVICE
Filed July 29, 1955 3 Sheets-Sheet 3

INVENTOR.
ROBERT S. BRADSHAW
BY
ATTORNEY

United States Patent Office 2,955,755
Patented Oct. 11, 1960

2,955,755

ELECTRO-MECHANICAL STORAGE, TRANSFER, AND READ-OUT DEVICE

Robert S. Bradshaw, Broomall, Pa., assignor to Burroughs Corporation, Detroit, Mich., a corporation of Michigan Filed July 29, 1955, Ser. No. 525,343

7 Claims. (Cl. 235—60.33)

This invention relates to data storage apparatus and, more particularly, to apparatus wherein information is adapted to be indexed, stored, read out and transferred from one machine to another electromechanically.

In many calculating devices, business machines and the like, it is desirable to be able to index information into a machine, store and read or transfer this same information out of the machine at will. It is also desirable in most cases that the information be in a form which is readily available for use and which can be utilized with more than one machine without costly and complex translational apparatus being necessary. Further, it is desirable that the transfer of this information from one machine to another be made simply and instantaneously and that an exact electrical or mechanical correspondence exist between the machine elements supplying the original information and the machine elements of the unit into which the information is to be introduced.

This invention has the object of providing simple and relatively inexpensive means for reading out, storing and transferring positional information utilizing electrical switches. By causing the contacts of the switches to assume positions corresponding to the mechanical positions of the parts of the first machine and then placing an electrical potential on the selected contacts an electrical output can thus be generated. This electrical output may be used to indicate to some remotely located apparatus the exact position of the elements in the original apparatus and thus the remote unit is caused to be operated in exact correspondence with the machine supplying the original electrical or mechanical information.

An object of the invention is to provide an improved switch unit for transferring a selected number from a type bar printer to an indicating dial as a read-out for the number or a storage of that number for later use.

Another object is to provide a number read-out switch, which in assembled condition, occupies a minimum of space to thereby permit a greater number of selector racks to be used in a machine of this character than has heretofore been possible.

Another object is to provide a number selector switch for read-out circuits wherein hand soldering and insulating of wire connections are eliminated.

A further object is to provide a switch unit for read-out circuits in association with dielectric cards having printed circuit contacts for setting up a number circuit corresponding to a number selected by a depressed number key of a keyboard accounting machine.

A still further object is to provide a combination of a number rack selective mechanism and a circuit selecting switch wherein a rotor contactor and printed circuit contacts coact to close a number read-out circuit corresponding to a selected number in response to the rack operation and under the control of a coil spring defining the number position of the contactor.

Figure 4:
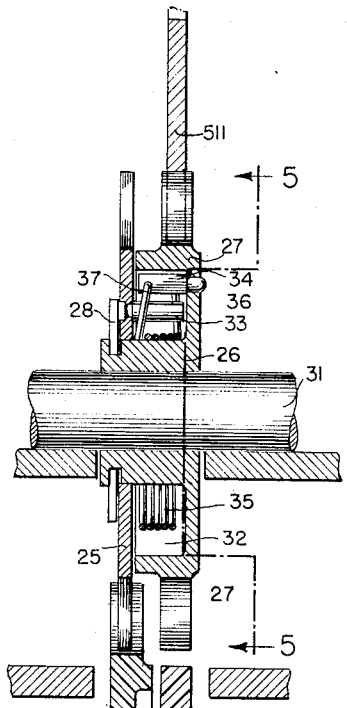
Figure 2:
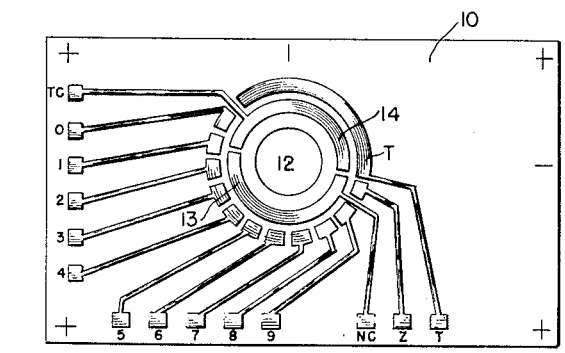
Figure 3:
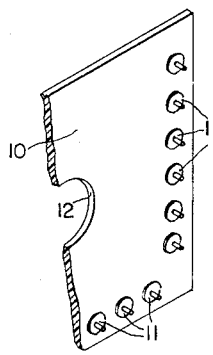
Figure 8:
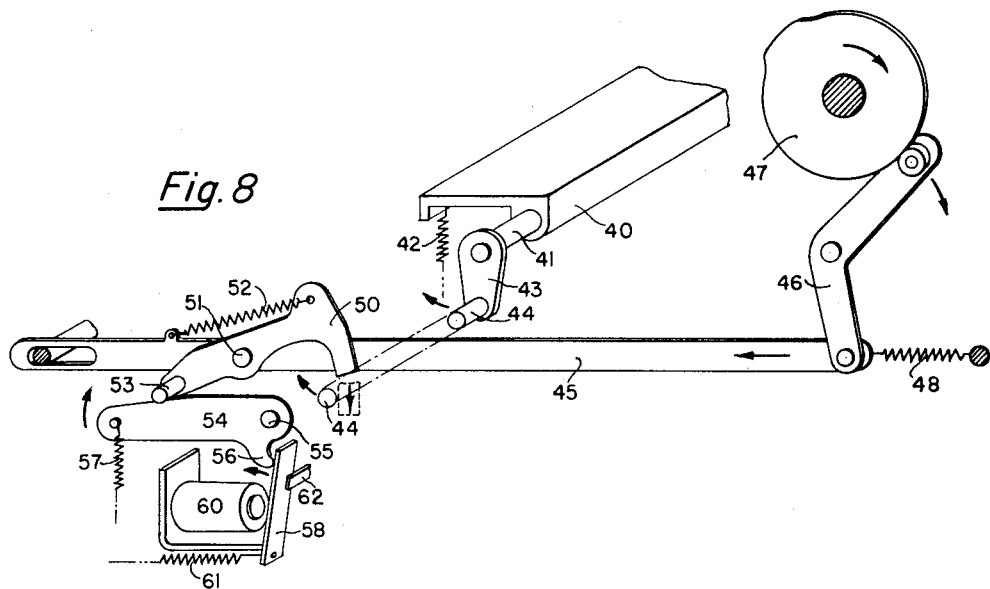
Figure 5:
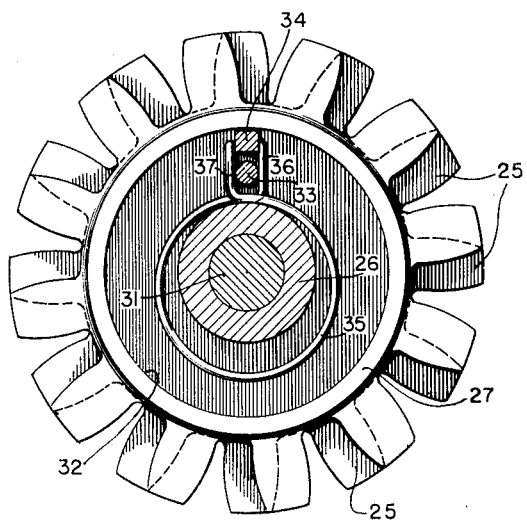
Figure 6:
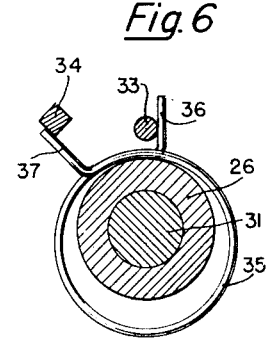
Figure 7:
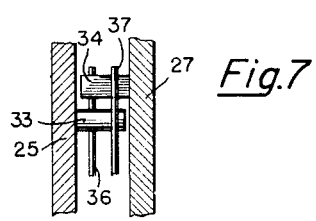
Figure 9:
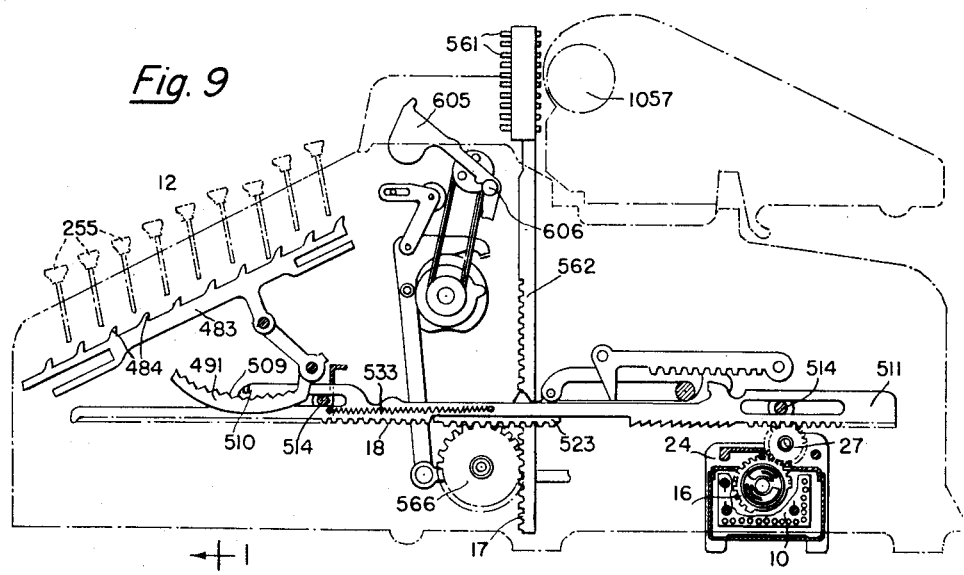
Figure 10:
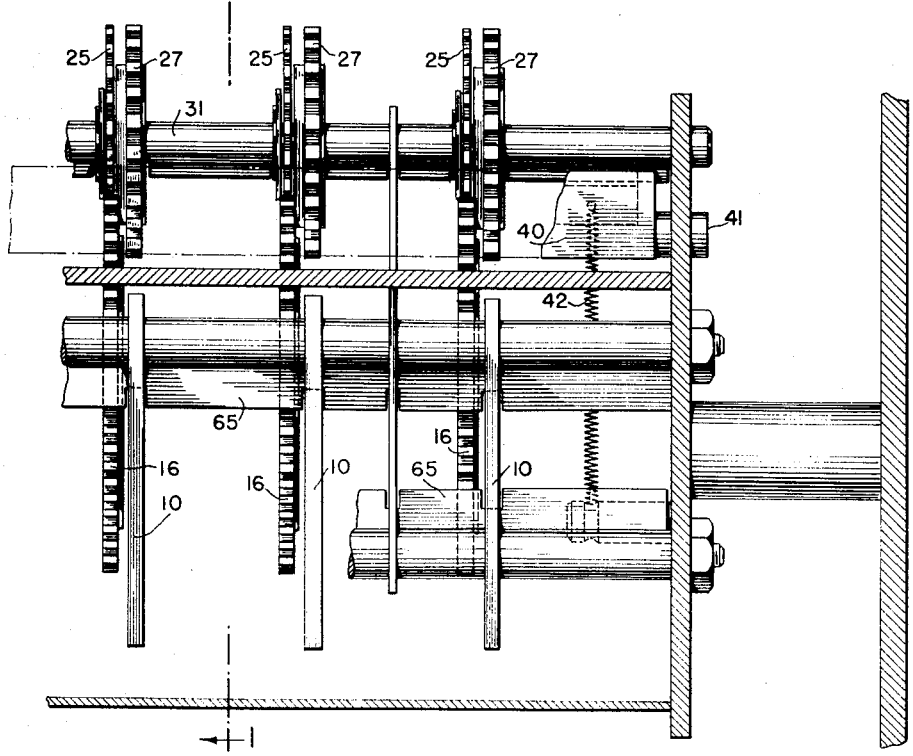

In the accompanying drawings, Fig. 1 is a sectional, elevational view, partly broken away, of a circuit control box of a read-out unit for association with a printing calculator, showing one form of circuit selecting switch; Fig. 2 is a face view of a circuit selecting card showing the fixed contacts functioning as a part of the switch of Fig. 1; Fig. 3 is a fragmentary perspective view of the reverse side of the card of Fig. 2 showing the projecting terminals for circuit connection; Fig. 4 is an enlarged section view on line 4—4 of Fig. 1, the scale being approximately 4 to 1; Fig. 5 is an enlarged face view of the control pinion showing the number selector unit in a zero position; Fig. 6 is a detail face view, in part section, of the number selector unit for the switch positioned for a selected number; Fig. 7 is a detail fragmentary section of a part of the bidirectional spring, associated gears and the spring controlled position defining pins; Fig. 8 is a schematic showing of one form of switch detent control; Fig. 9 is a fragmentary diagrammatic view of a printing apparatus as an associated part of the present invention; and Fig. 10 is a fragmentary vertical section view of the machine showing the multiple arrangement of the cards and switch control.

Referring to Fig. 2 of the drawings, there is shown a circuit card 10 of dielectric material illustrating one form of printed wiring utilized in the practice of the invention. The card has a plurality of circuit terminals representing, in this instance, sequential numbers "0" to "9," a number common return "NC," an auxiliary zero, "Z," and terminals "T" and "TC" for test purposes to by-pass number selection. All of these terminals pass through the card to provide contact posts 11 on the opposite side of the card (Figs. 1 and 3), for connections to circuits controlled by the switch of which the printed wiring selector forms the fixed contacts. The terminals are electrically connected by printed wiring leads to two concentric segmental rings of different radii encircling a through hole 12 in the card 10 as a support for the contactor element of the switch. The outer of the two contact rings consists of an arcuate row of contacts corresponding respectively to the number terminals, "0" to "9," plus individual contacts "NC," "Z" and contact "T." The inner ring contact comprises two substantially semi-circular segments 13 and 14, the former 13 being connected to terminal "NC" as the common return for the number circuits, and the latter 14 being the return of the test circuit. These sets of contacts on the card face serve as the fixed contacts of a rotor switch, which according to its selected angular position closes a circuit to one of the row of terminals by bridging the pair of contacts for the circuit. These terminals project through to the opposite face of the card to provide the contact posts 11 defining separate circuits to be selected in accordance with numbers set up by the type bar rack of the printer mechanism for indicating or storing as read-outs on a dial or the like.

For the selection of a circuit to be operated, as best shown in Figs. 1 and 4, a rotor switch element is provided having a bifurcated wiper spring contactor 15, fixed at one end to the face of a nylon gear 16, and carrying contactor buttons 17 and 18, respectively disposed to ride over the number segments and the return terminal "NC." Thus each arm of the contactor 15 has a radius the same as the contacts with which it coacts and each is spring flexed, or biased, to maintain the buttons 17 and 18 riding on the respective contacts to bridge the terminals of a selected circuit. Similarly a second bifurcated wiper spring contactor 20 is fixed to the gear 16 in the correct position for its contactor buttons 21 and 22 to ride upon the respective contacts 14 and "T." Thus by turning the gear 16, the circuit selecting wiper contactors can be brought to a circuit closing position designating the number circuit to be set up. The gear 16 with its attached contactors thus becomes a selective wiper switch for bridging any one of a number of separate circuit terminals. The gear 16 is journalled on a stud 23 projecting from the contact face of the card 10, such stud 23 being coincident with the center or axis of the fixed segmental contacts. Thus the card and its attached gear 16 becomes a complete unit to thereby lend itself to multiple assembly in a comb or the like as one of many such switches extending for example throughout the length of an elongated housing or casing 24.

As a means for turning the wiper contactor gear for position selection, it is in mesh with a pinion 25 mounted for free relative turning movement upon the hub 26 of a driven rack pinion 27. The pinion 25 is there held laterally in place such as by a clip 28 resiliently snapped into place onto the hub 26. The rack pinion 27 is in mesh with the teeth of a rack 511 and is journalled upon a fixed shaft 31 for free turning movement by the operation of the rack 511. Also this rack pinion 27 is formed with an annular recess 32 which serves as receptacle for the novel mechanism by which the rack pinion 27 transmits a selected number to the wiper contactor switch for corresponding number set-up on the card 10.

This setting mechanism for the rotary wiper switch comprises a pin 33 projecting from the wiper switch pinion 25 into the recess 32 in parallel relation to the shaft 31 and a second pin 34 also paralleling the shaft 31 and projecting into the recess 32 but spaced from the juxtaposed side of the rack pinion 27. The pin 34 is preferably square in section to provide a flat bearing surface. The two pins 33 and 34 are at different distances from the axis of the shaft 31 but normally lie in the same radial plane on the same side of the shaft for relative turning about the shaft 31 as an axis. A bidirectional torsion spring 35 is coiled about the hub 26 and has its opposite extremities 36 and 37 bent outwardly to form arms which straddle the two spaced pins 33 and 34 as best shown in Fig. 5. The two ends of the spring are so biased as to create a torque tending to turn the two pinions 25 and 27 when free to rotate to the relative position of the parts assumed in Fig. 5 where the bent arms 36 and 37 of the spring abut both pins 33 and 34 and hold the two pinions in this assumed normal position.

In the type of printing calculator to which the invention relates it is desirable to select a number and store that number while a second number is being selected and to that end provision is made for holding the switch in a number set position while the rack 511 is selecting another number or until such time as the set number is to be changed. While reference heretofore has been made to the selection of one member only, it is to be understood that this calculating machine will be usually equipped with a plurality of similar switch units and printed wiring cards arranged in a row across the machine, so that a total or other numbers can be selected for read-out or storage purposes.

For carrying out this holding operation a pivoted detent 40, common to all of the contactor gears 16, is provided and so located as to engage the teeth of each switch gear 16 and lock its pinion 25 against rotation during the number setting cycle of the rack 511. Consequently the setting movement of the rack member 511 rotates its rack pinion 27 and carries the pin 34 and spring arm 37 with it in the direction to wind the spring 35 to place the pinion 25 under a restrained torque until the detent 40 is removed whereupon the wiper pinion is released to the tensioned spring arm 36 and the spring torque turns until the spring arm 36 abuts the pin 34 in the new position determined by the selector rack 511 thereby turning the switch rotor contactors to set-up the selected number. Assuming the number "7" is to be set for reading or storage, the rack 511 in response to a keyboard selection of "7," winds the spring 35 by turning the pinion 27 and its pin 34 through the required arc numeral "7" thereby increasing the tension of the spring and separating the pins as indicated in Fig. 6. This will set-up the stop position of the pin 33 for "7" when the detent 40 releases the pinion 25 for response to the tension of the spring. This release is arranged to operate during the cam dwell period of the machine for a printing operation and may be directly controlled by a cam operating in timed relation to the rack 511 cycle or by a pulse signal system.

In Fig. 8 a detent control mechanism is shown for either mechanical or electrical signal control of the detent 40, comprising a rock-shaft 41 carrying the detent 40 for pivotal movement about a horizontal axis and in its normal position is biased by a tension spring 42 to hold the detent in meshing relation to one or more of the gears 16. The shaft 41 carries an arm 43 having a control pin 44 which, in assembled position of the parts, lies below and adjacent to a reciprocable bar 45. This bar 45 is actuated on its working stroke by a pivoted follower 46 from a cam 47 in timed relation to the rack cycle cam of the calculating machine in order that the detent can be released during the dwell of the type bars of the printer. A tension spring 48 serves as a bar restoring means and follower contact means.

For causing the bar 45 to transmit release movement to the detent 40, a latch member 50 is pivoted at 51 to the bar 45 to swing into and out of alignment with the detent pick-up pin 44, while a spring 52 is stretched between the latch 50 and the bar 45 to normally hold the latch 50 out of pin engaging position when not under signal control. A pin 53 projects from the member 50 on the opposite side of the pivot 51 from the latch part, and is arranged to ride upon the top of a rock-arm 54, which is pivoted at 55 to a suitable fixed part, and has a lug 56 pressed by a tension spring 57 against an armature clapper 58. A solenoid 60 is mounted for operative association with the clapper 58 and when energized by a signal pulse attracts the clapper 58 to initiate a detent release operation. A spring 61 biases the armature clapper 58 to its inactive position against a stop 62 when the solenoid is deenergized. The foregoing pulse control for detent release operates as follows: When the rack 511 brings a type bar to the selected number, the position control pin 34 is brought to the corresponding number for switch operation whereupon the detent control bar 45 is shifted, to the left, as shown in Fig. 8 by the timing cam 47. Upon the receipt of a signal pulse the solenoid 60 is energized to attract the clapper 58. This clapper movement rocks the arm 54 to lift the pin 53 and rock the latch 50 clockwise back of the pin 44 so that the forward movement of the bar 45 transmits motion through the pin 44 to arm 43 to lift the detent 40 out of mesh with the gear 16 whereupon the arm 36 of the tensioned spring 35 is released. Thereupon the retracting spring arm 36 causes the wiper pin 33 and its pinion 25 to swing to the position shown in Fig. 6 where it is stopped by the arm 37 in the position set by the pin 34 as described. The spring 35 is again under little tension and the two pins 33 and 34 are again aligned but at a new angular position and the detent 40 is again ready to lock the gear 16.

However upon the return stroke of the rack 511 the pin 34 now follows the movement to again wind the spring 35 but in the opposite direction ready for another number selection. Assuming the set number is "7" and the new number to be selected by the rack 511 is "4," for example, then the working stroke of the rack 511 sets the pin 34 at the "4" position stop location. Now when the detent 40 releases the wiper unit pinion 25 to the spring 35, the pin 33 will turn in the opposite direction from its former movement to stop against the arm 36 in radial alignment with pin 34 in its new position and stop the wiper unit to select and close the circuit for the number "4." In other words the reverse spring action will move the pin 33 back three numbers so that the selected contactor and contact will close circuit for number "4." The torque action of the spring is either clockwise or counter-clockwise from any retained position of the pins after the initial zero position. Thus the spring causes the wiper gear pinion 25 to rotate the wiper gear 16 up to a half of a revolution from the old number to the new number in either direction, that is from a zero to a nine or from a nine to a zero.

Also it will be seen that turning of either released spring arms 36 or 37 transfers the movement through pinion 25 to wiper gear 16, which in turn sets the bifurcated contactor 15 or 20 in position to close the circuit for the number selected.

In order to fully comprehend the significant features of the instant invention, it is desirable to describe, to at least a limited extent, the environment in which it is utilized. For a complete and detailed disclosure of this environment, resort may be had to Patent No. 2,629,549 issued to T. M. Butler, on February 24, 1953, for an Automatic Function Control Mechanism for Accounting Machines. In order to expedite cross-referencing, the reference numerals employed in the instant disclosure will, to the extent that it is practical, be identical to those designating similar elements in the above-identified patent to Butler.

In the illustrated embodiment of the invention, and referring more particularly to Fig. 9 therein, the numeral 12 generally designates a machine of the type described in the aforesaid patent, comprising printing types 561 carried by a plurality of vertically extending print bars 562 and an equal number of actuator racks 511, all of which lie in planes parallel to that of the drawing. The actuator racks are forwardly and rearwardly slidably supported by two rods 514 riding respectively in slots in the racks and extending transversely across the machine to have their ends fixed to the machine side plates.

As may be seen from the drawing, the print bars carry at their upper ends a plurality of type slugs which are movable transversely of the bars. Forward of the bars, and pivoted about a shaft 606 are the hammers 605, each associated with an individual one of the print bars, which upon striking an aligned slug in its print bar will cause the latter to leave an impression upon a recording medium interposed between the slugs and platen 1057.

The movement of the rack 511 by tension spring 533 to the left, as shown in Fig. 9, performs two functions, one setting a type bar and the other operating the wiper pinion of the rotor switch. For carrying out the first function the rack 511 has an attached plate 523 having teeth 18 in mesh with a gear 566 meshing with a series of rack teeth 17 on a selected one of a plurality of print bars 562. The carrying out of the second function is related to the arrested positions of the rack 511 and this is determined by the operation of a selected key 255 in the machine keyboard. When a key 255 is depressed the lower end of its stem will be engaged by the corresponding stop 484 on the slide 483 to arrest the slide and the connected sector 491 in a differential position appropriate to the value of the particular key 255 which is depressed in the key row. The stop sector 491 has a series of spaced stop shoulders 509 adapted to cooperate with a laterally disposed lug 510 on the actuator rack 511. With the lug 510 engaging the selected shoulder 509, the rack 511 is stopped in the position corresponding to the key number depressed. As a result the switch rotor through the wiper pinion 25 closes the circuit to set up the number corresponding to the foregoing key depression.

While the foregoing is directed to a single switch unit as operated by its rack, it will be seen from Fig. 10 that the complete accounting machine includes a plurality of the contact printed cards and the selecting mechanism therefor. These cards and their respective selecting mechanisms are mounted in the elongated housing 24 which, as shown in Fig. 9, extends transversely across the machine below the racks 511. Thus the cards 10 may be supported in parallel spaced apart relation by three combs 65 respectively seating opposite ends of the cards. The contact faces of the cards 10 preferably face in the same direction in the housing 24, see Fig. 9, and their respective rotor contactors 16 are disposed opposite the cards, while the row of wiper pinions 25 and rack pinions 27 project through the top of the housing with the one pinion of each group of two pinions meshing with a selector rack 511. The detent 40 is preferably a single member extending the length of the housing and serving as a common locking member for all the switch mechanisms. During the period when the keys 255 are depressed and the rack bars 511 selected thereby move forwardly to positions corresponding to the values of the depressed keys, the detent 40 is in engagement with the gears 16 holding them against rotation. The depressed key values are stored in the switch mechanism by the rotation of the pinions 27 to angular positions corresponding to the values depressed in the keyboard. Thus, the switch mechanism serves to store the numbers depressed in the keyboard preparatory to being read thereout. At a desired time during a dwell period in the operation of the rack bars 511, the solenoid 60 is pulsed and the numbers stored in the switch mechanism can then be read out through the terminals 11. It is also evident that the number selector unit including spring 35 and associated stop pins 33 and 34 need not return to initial starting position for the next operation but either be advanced or retracted from a key depressed position and store the new information in the unit until such time as the information is read thereout. The switch unit therefor need not return to the zero position illustrated in Fig. 5 but may travel directly from the old number position to a new number position.

What is claimed is:

1. A number storage, read-out and transfer mechanism for a calculating machine having a keyboard comprising, in combination, a first gear wheel rotatable to anyone of a plurality of angular positions corresponding to the actuation of the selected key on the keyboard, a dielectric member provided with a plurality of electrically conductive printed wiring contacts on one face thereof for use with a plurality of associated electrical circuits, a switch rotor carrying wiper contactors, said rotor switch being operatively arranged to move said contactors across the contacts of said dielectric member thus to interconnect selected pairs of contacts thereon, a second gear wheel engaging the teeth of said switch rotor, a retractable stop member engaging the teeth of said rotor to prevent the same from turning, a first pin projecting from said first gear wheel, a second pin projecting from said second gear wheel parallel with and radially spaced from said first pin, a spiral spring having its ends coupled to said pins and pretensioned normally to hold said pins in radial alignment, the arrangement of the pins and the spring being such that the first gear wheel may be rotated in opposite directions relative to the second gear wheel, the displacement of the pins by virtue of this relative rotation of the first gear wheel being representative of the selected key of the keyboard and at the same time serving to mechanically store this information for future utilization, and means for retracting the stop member to enable said spring to urge the second pin to follow the first pin and thus rotate the second gear wheel and the switch rotor to cause said wiper contactors to close the electrical circuit corresponding to the key selected on the keyboard.

2. A number storage, read-out and transfer mechanism for a calculating machine having a keyboard comprising, in combination, a first gear wheel rotatable to any one of a plurality of angular positions corresponding to the actuation of a selected key on the keyboard, a dielectric member provided with a plurality of electrical contacts on one face thereof for use with a plurality of associated electrical circuits, a toothed switch rotor carrying a wiper contactor, said switch rotor being operatively arranged to move said contactor successively across the electrical contacts of said dielectric member, a second gear wheel coaxially mounted with respect to the first gear wheel and engaging the teeth of said switch rotor, a retractable stop member also engaging the teeth of said switch rotor to prevent the same from turning, means projecting from said first gear wheel, means projecting from said second gear wheel, a coiled spring member encircling the axis of rotation of the two gear wheels and having its ends coupled to said projecting means, said spring member being pre-tensioned normally to hold both said projecting means in a common radial relation to the axis of rotation of the two gear wheels, the arrangement of the projecting means and the spring member being such that the first gear wheel may be rotated in opposite directions relative to the second gear wheel, the displacement of the projecting means by virtue of this relative rotation of the first gear wheel being representative of the selected key of the keyboard, and means for retracting the stop member to enable said spring member to urge the means projecting from said second gear wheel to follow the means projecting from the first gear wheel and thus rotate the second gear wheel and the switch rotor to cause said wiper contactor to engage the electrical contact corresponding to the key selected on the keyboard.

3. A number storage, read-out and transfer mechanism for a calculating machine having a keyboard comprising, in combination, a switch mechanism including a plurality of electrical contacts individually connectible to different circuits and a wiper contactor movable successively over the electrical contacts to close the circuits, a first member rotatable about an axis to any one of a plurality of angular positions corresponding to the actuation of a selected one of a number of keys on the keyboard, a second member rotatable about the same axis as the first member and disposed adjacent thereto, means drivingly coupling the second member to the wiper contactor of the switch mechanism and responsive to the rotation of the second member for moving the same successively over the electrical contacts, a pin projecting laterally from the first member toward the second member and a pin projecting laterally from the second member toward the first member, a coiled spring element encircling the axis of rotation of the two members and disposed therebetween, said spring element being pre-tensioned to resiliently urge its opposite ends together and having one end in engagement with one of said pins and the other end in engagement with the other of said pins such that the two pins are yieldingly urged toward and normally held in a common radial relation to the axis of rotation of the two members, the arrangement of the pins and the spring element being such that the first member may be rotated in opposite directions relative to the second member against the tension of the spring element, movable stop means operatively associated with the second member and effective in one position to hold the same from rotation as the first member is rotated and effective in another position to release the second member for rotation and to permit the same to be urged by the spring element in the direction of rotation of the first member, the angular displacement of the pins as a result of the rotation of the first member relative to the second member being representative of a selected key of the keyboard, and control means for controlling the movement of the stop means and operable to cause the stop means to hold the second member from rotation in any position to which it is urged by the spring element whereby the first member may be initially rotated in either direction while the second member is held and the second member may be subsequently released to follow the direction of rotation of the first member.

4. A rotary number storage mechanism comprising, in combination, a support, a read-in member journaled on said support for rotation in opposite directions, means for moving said read-in member from a home position representative of a number to other angular positions representative of other different numbers, a number storage member journaled on said support for rotation in opposite directions and to different positions corresponding to the home and the number positions of the first member to thereby store the number represented by each such position, spring means operatively interposed between the number storage member and the read-in member and drivingly coupling the storage member to the read-in member so as to yieldingly urge the storage member to follow the read-in member and assume any number position thereof, a stop member, means to move said stop member between advanced and retracted positions, said stop member when in advanced position being operable to hold said number storage member in a selected number position during the rotation of the read-in member to any other number position, and said stop member when in retracted position being operable to release the number storage member and permit it to follow the direction of rotation of the read-in member under the force exerted by the spring means and assume the number position of the read-in member, and electrical circuit means coupled to the storage member for reading out the number indicated by the position assumed thereby.

5. In a device for storing different numbers indexed into a machine in which a differentially positionable rack member moves to positions indicative of different numbers and then moves to another position indicative of another of the numbers, a shaft, a switch carrying gear rotatable on said shaft and adapted upon rotation to close electrical contacts, a second shaft mounted parallel to said first shaft, a rotatable pinion on said second shaft to be rotated by said positionable rack member in storing said numbers and being shaped to provide an axially extending hub and an annular recess surrounding the hub, a second gear rotatably journaled on the hub on one side of said pinion and in mesh with said switch carrying gear, one face of the second gear cooperating with said hub to enclose said recess and thereby form a compartment on the said one side of said pinion, a coiled spring within said compartment operatively connecting said pinion to said second gear, said spring on rotation of said pinion by the rack member storing forces acting to rotate said second gear, a retractible detent normally engaging one of said gears and restraining the same and other gear from rotation by said spring, and an electromagnet including an armature clapper operably engageable with said detent and actuatable to retract the same and release the restrained gears for rotation.

6. A number storage and read-out mechanism comprising, in combination, a supporting shaft, a pinion wheel rotatable on said shaft in one direction to a position representative of a number and in the opposite direction to another position representative of another number, a second pinion wheel rotatable on said shaft in opposite directions to assume positions corresponding respectively to the number positions of said first pinion wheel, a retractible stop member normally restraining said second pinion wheel, an electromagnet provided with an armature clapper, said clapper being operably connected to said stop member and capable of moving the stop member to positions for either restraining or releasing said second pinion wheel in response to energization and de-energization of said electromagnet, a spring coiled around said supporting shaft and having its terminal ends forming a pair of abutment elements, a projecting member on each of said pinion wheels abutted by a respective one of the abutment elements of said spring in opposed relation to one another to respectively transmit opposite directional movements of the first pinion wheel to the second pinion wheel through the spring, said spring adapted to be placed under tension by rotation of the first pinion wheel relative to the second pinion wheel and to store a force acting to rotate the second pinion upon release of the latter by said stop member, and electrical circuit means coupled to said second pinion wheel for reading out the numbers indicated by the positions assumed thereby.

7. A rotary number storage mechanism comprising, in combination, a support, a read-in member journaled on said support for rotation in opposite directions, means for rotating said read-in member from an initial starting position to angular positions representative of different numbers, a number storage member journaled on said support for rotation in opposite directions and to different positions corresponding to the starting position and the number positions of the first member to thereby store the number represented by each such position, spring means operatively interposed between the number storage member and the read-in member and drivingly coupling the storage member to the read-in member so as to yieldingly urge the storage member to follow the read-in member in either of its two opposite directions of rotation and to assume any number position thereof, said spring means being operable upon rotation of the read-in member in either direction relative to the number storage member to store forces to provide a torque action for rotating the storage member at a later time to the position assumed earlier by the read-in member, a stop member, means to move said stop member between advanced and retracted positions, said stop member when in advanced position being operable to hold said number storage member in a selected number position during the rotation of the read-in member to any other number position, and said stop member when in retracted position being operable to release the number storage member and permit it to follow the direction of rotation of the read-in member under the force exerted by the spring means and to assume the number position of the read-in member, and electrical circuit means coupled to the storage member for reading out the number indicated by the position assumed thereby.

References Cited in the file of this patent

UNITED STATES PATENTS

| | | |
|---|---|---|
| 1,916,987 | Peirce | July 4, 1933 |
| 2,004,282 | Horton | June 11, 1935 |
| 2,127,733 | Herbst | Aug. 23, 1938 |
| 2,289,055 | Landsiedel | July 7, 1942 |
| 2,309,069 | Sobisch | Jan. 19, 1943 |
| 2,522,029 | Field | Sept. 12, 1950 |
| 2,531,205 | Gang | Nov. 21, 1950 |
| 2,550,133 | Allan | Apr. 24, 1951 |